United States Patent
Blumrich et al.

(10) Patent No.: US 7,680,971 B2
(45) Date of Patent: Mar. 16, 2010

(54) METHOD AND APPARATUS FOR GRANTING PROCESSORS ACCESS TO A RESOURCE

(75) Inventors: Matthias A. Blumrich, Ridgefield, CT (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 11/768,799

(22) Filed: Jun. 26, 2007

(65) Prior Publication Data

US 2009/0006692 A1 Jan. 1, 2009

(51) Int. Cl.
*G06F 13/14* (2006.01)

(52) U.S. Cl. .................. 710/244; 710/117; 710/113; 710/111

(58) Field of Classification Search ......... 710/104–125, 710/240–244
See application file for complete search history.

(56) References Cited

U.S. PATENT DOCUMENTS

| | | | |
|---|---|---|---|
| 6,311,249 B1 * | 10/2001 | Min et al. | 710/111 |
| 6,880,028 B2 * | 4/2005 | Kurth | 710/240 |
| 7,007,123 B2 * | 2/2006 | Golla et al. | 710/243 |
| 7,065,594 B2 * | 6/2006 | Ripy et al. | 710/113 |
| 7,143,219 B1 * | 11/2006 | Chaudhari et al. | 710/111 |
| 2004/0210694 A1 * | 10/2004 | Shenderovich | 710/113 |
| 2007/0174529 A1 * | 7/2007 | Rodriguez et al. | 710/240 |

* cited by examiner

*Primary Examiner*—Raymond N Phan
(74) *Attorney, Agent, or Firm*—Scully, Scott, Murphy & Presser, P.C.; Daniel P. Morris, Esq.

(57) ABSTRACT

An apparatus and method for granting one or more requesting entities access to a resource in a predetermined time interval. The apparatus includes a first circuit receiving one or more request signals, and implementing logic for assigning a priority to the one or more request signals, and, generating a set of first_request signals based on the priorities assigned. One or more priority select circuits for receiving the set of first_request signals and generating corresponding one or more fixed grant signals representing one or more highest priority request signals when asserted during the predetermined time interval. A second circuit device receives the one or more fixed grant signals generates one or more grant signals associated with one or more highest priority request signals assigned, the grant signals for enabling one or more respective requesting entities access to the resource in the predetermined time interval, wherein the priority assigned to the one or more request signals changes each successive predetermined time interval. In one embodiment, the assigned priority is based on a numerical pattern, the first circuit changing the numerical pattern with respect to the first_request signals generated at each successive predetermined time interval.

28 Claims, 5 Drawing Sheets

METHOD AND APPARATUS FOR GRANTING PROCESSORS ACCESS TO A RESOURCE

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,786, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL", U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,812, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "TOWER THROTTLING OF COLLECTIONS OF COMPUTING ELEMENTS".

BACKGROUND OF THE INVENTION

1. Field of the Invention

The present invention generally relates to computer systems having multiprocessor architectures and, more particularly, to a novel multi-processor computer system for processing memory accesses requests and enabling the fair sharing of limited resources in a computer system, particularly, multiprocessor systems, by a novel arbitration scheme.

2. Description of the Prior Art

To achieve high performance computing, multiple individual processors have been interconnected to form multiprocessor computer systems capable of parallel processing. Multiple processors can be placed on a single chip, or several chips—each containing one or several processors—interconnected into a multiprocessor computer system.

Processors in a multiprocessor computer system use private cache memories because of their short access time (a cache is local to a processor and provides fast access to data) and to reduce the number of memory requests to the main memory. However, managing caches in a multiprocessor system is complex. Multiple private caches introduce the multicache coherency problem (or stale data problem) due to multiple copies of main memory data that can concurrently exist in the multiprocessor system.

Small scale shared memory multiprocessing systems have processors (or groups thereof) interconnected by a single bus. However, with the increasing speed of processors, the feasible number of processors that can share the bus effectively decreases.

The protocols that maintain the coherence between multiple processors are called cache coherence protocols. Cache coherence protocols track any sharing of data blocks between the processors. Depending upon how data sharing is tracked, cache coherence protocols can be grouped into two classes: directory based and snooping.

In a multiprocessor system with coherent cache memory, consistency is maintained by a coherence protocol that generally relies on coherence events sent between caches. A common hardware coherence protocol is based on invalidations. In this protocol, any number of caches can include a read-only line, but these copies must be destroyed when any processor stores to the line. To do this, the cache corresponding to the storing processor sends invalidations to all the other caches before storing the new data into the line. If the caches are write-through, then the store also goes to main memory where all caches can see the new data. Otherwise, a more complicated protocol is required when some other cache reads the line with the new data.

In a cache-coherent multiprocessor system, there may be bursts of activity that cause coherence actions, such as invalidations, to arrive at a cache faster than the cache can process them. In this case, they are generally stored in first-in, first-out (FIFO) queues, thereby absorbing the burst of activity. As known, FIFO queues are a very common structure used in computer systems. They are used to store information that must wait, commonly because the destination of the information is busy. For example, requests to utilize a shared resource often wait in FIFO queues until the resource becomes available. Another example is packet-switched networks, where packets often wait in FIFO queues until a link they need becomes available.

It is known in the art that FIFO queues enable fair sharing of limited resources in a computer system. An arbiter, a common feature of computer systems, acts as a gatekeeper, arbitrating among multiple requestors to determine which is granted access to a desired resource and in what order. In general, this is necessary when a resource cannot be shared but multiple requesters desire to use it simultaneously.

Arbitration can be as simple as granting each requestor access in order, or it can be based on some priority criteria applied to the requesters. For example, most processors can only service a single hardware interrupt at a time, so a complex arbiter is used to determine the order with which multiple interrupt requests are presented to the processor. Interrupt requests are commonly assigned priority based on how urgently they need to be serviced. For example, dynamic memory refresh is far more important than the completion of a hardware DMA operation.

Arbiters that take priority into account must also deal with the issue of starvation. This is when a low-priority request is constantly passed over in favor of higher-priority requests, causing it to be denied service (or "starve"). In some cases, this is acceptable while in other cases the arbiter must insure that low priority requests eventually get serviced. A common technique for accomplishing this is to increase the priority of requests the longer they wait for service so that they will eventually become high-priority requests.

Most arbiters grant a single request each arbitration cycle. In some cases, it would be desirable to grant more than one. For example, the resource being shared has the capacity to handle more than one request per arbitration cycle, either because of resource availability or because the resource operates faster than the arbiter. Thus, what is needed is an arbiter implementing an arbitration methodology that can grant multiple requests in a single arbitration fairly and efficiently.

What is further needed is an arbitration mechanism for sharing a snoop, or invalidation, port of a cache between multiple queues of invalidation requests broadcast from remote processors in a coherent multiprocessor system.

SUMMARY OF THE INVENTION

The present invention provides a novel arbitration mechanism for selecting one or more request signals from among a plurality of request signals requesting access to a shared resource.

In one embodiment, the arbitration mechanism enables the sharing of a snoop, or invalidation port of a cache between multiple queues of invalidation requests broadcast from remote processors in a coherent multiprocessor system.

That is, the present invention teaches an apparatus and method for granting one or more requesting entities access to a resource in a predetermined time interval (e.g., an arbitration cycle), each requesting entity asserting a request signal for accessing the resource. An arbitration cycle corresponding to a time in which said grant signals associated with said one or more of said asserted request signals is generated.

In accordance with one aspect of the invention, the apparatus for granting one or more requesting entities access to a resource in a predetermined time interval comprises:

first circuit means for receiving one or more request signals, implementing logic for assigning a priority to the one or more request signals, and, generating a set of first_request signals based on the priorities assigned to received request signals;

one or more priority select circuits for receiving the set of first_request signals and generating corresponding one or more fixed grant signals representing one or more highest priority request signals when asserted during the predetermined time interval;

second circuit means for receiving the one or more fixed grant signals and implementing logic for generating one or more grant signals associated with one or more highest priority request signals assigned, the grant signals for enabling one or more respective requesting entities access to the resource in the predetermined time interval, wherein the priority assigned to the one or more request signals changes each successive predetermined time interval.

In one aspect of the invention, the assigned priority is based on a numerical pattern, the first circuit means including means for changing the numerical pattern with respect to the first_request signals generated at each successive predetermined time interval.

Further to this aspect of the invention, the logic implemented by the first circuit means includes logic for rotating the numerical pattern in a round-robin fashion each successive predetermined time interval.

Further to this aspect of the invention, the logic implemented by the second circuit means includes logic for rotating the fixed grant signals in a manner complementary to the rotating logic implemented by the first circuit means, for generating the grant signals associated with the one or more of the asserted received request signals according to the assigned priority.

In a further aspect of this invention, the first circuit means further comprises:

a counter circuit for generating output count signals each successive predetermined time interval, the first circuit means responsive to the output count signals for changing the numerical pattern to assign a new ordered priority of request signals each predetermined time interval.

Further to this aspect of the invention, one or more priority select circuits for receiving the first_request signals comprises:

a first fixed priority select device for receiving the set of first_request signals and generating a corresponding set of fixed grant signals in a predetermined order, the first fixed priority select device further selecting a first winning fixed grant signal of the set of fixed grant signals, the first winning fixed grant signal for input to the second circuit means.

Further to this aspect of the invention, there is provided a reduction circuit for:

receiving first_request signals of the set, and, further receiving corresponding first set of fixed grant signals from the first fixed priority select device according to the predetermined order with the first winning fixed grant signal asserted, and, generating a set of second_request signals representing one or more second highest priority request signals with second_request signal corresponding to the first winning fixed_grant signal removed; and, the one or more priority select circuits including a second fixed priority select device for receiving the set of second_request signals and, generating a second set of fixed_grant signals for input to the second circuit means, the second set of fixed_grant signals including a selected second winning fixed grant signal corresponding to a second first_request signal of highest priority when the corresponding received second_request signals are asserted In one additional advantageous embodiment of this invention, there is provided a method for granting one or more requesting entities access to a resource in a predetermined time interval, the requesting entity asserting a request signal for accessing the resource. The method comprises:

receiving, at a first circuit device, the asserted request signals and implementing logic for assigning a priority to the one or more request signals, generating a set of first_request signals based on the priorities assigned to received request signals;

receiving, at a priority select circuit, the set of first_request signals and generating corresponding one or more fixed grant signals representing one or more highest priority request signals when asserted during the predetermined time interval;

receiving, at a second circuit device, the one or more fixed grant signals and implementing logic for generating one or more grant signals associated with one or more highest priority request signals assigned, the grant signals for enabling one or more respective requesting entities access to the resource in the predetermined time interval; and, changing the assigned priority of request signals each successive predetermined time interval.

Accordingly, in a further advantageous embodiment of the invention, there is provided in a multiprocessor computer system having a plurality of processor devices and associated memory storage devices, wherein each processor device broadcasts event request signals to other processor devices in the system for requesting the other processor devices to perform actions at respective the associated memory storage devices, a coherence logic unit associated with each processor device for intercepting the broadcast event request signals from the other processors devices, the coherence logic unit comprising:

a plurality of queue structures adapted for receiving and enqueuing the intercepted event request signals associated with a respective requesting processor device; and, arbitration device for selecting, during an arbitration cycle, one or more queue structures for dequeuing available enqueued event request signals when available for input to the associated processor device according to an assigned priority, the arbitration device selecting up to two or more queue structures for dequeuing a respective enqueued event request signal every arbitration cycle, wherein the assigned priority is changed each successive arbitration cycle.

Further to this advantageous embodiment, the arbitration device comprises:

a first circuit means for receiving one or more request signals, implementing logic for assigning a priority to the one or more request signals, and, generating a set of first_request signals based on the priorities assigned to received request signals;

one or more priority select circuits for receiving the set of first_request signals and generating corresponding one or more fixed grant signals representing one or more highest priority request signals when asserted during the predetermined time interval;

second circuit means receiving the one or more fixed grant signals and implementing logic for generating one or more grant signals associated with one or more highest priority request signals assigned, the grant signals for enabling one or more respective requesting entities access to the resource in the predetermined time interval.

Moreover, further to this embodiment, the assigned priority is based on a numerical pattern, the changing the assigned priority including: changing the numerical pattern with respect to the first_request signals generated each successive predetermined time interval.

Advantageously, while the invention is described in the context of a microprocessor chip, the invention can be broadly applied to many other digital chips, devices or systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
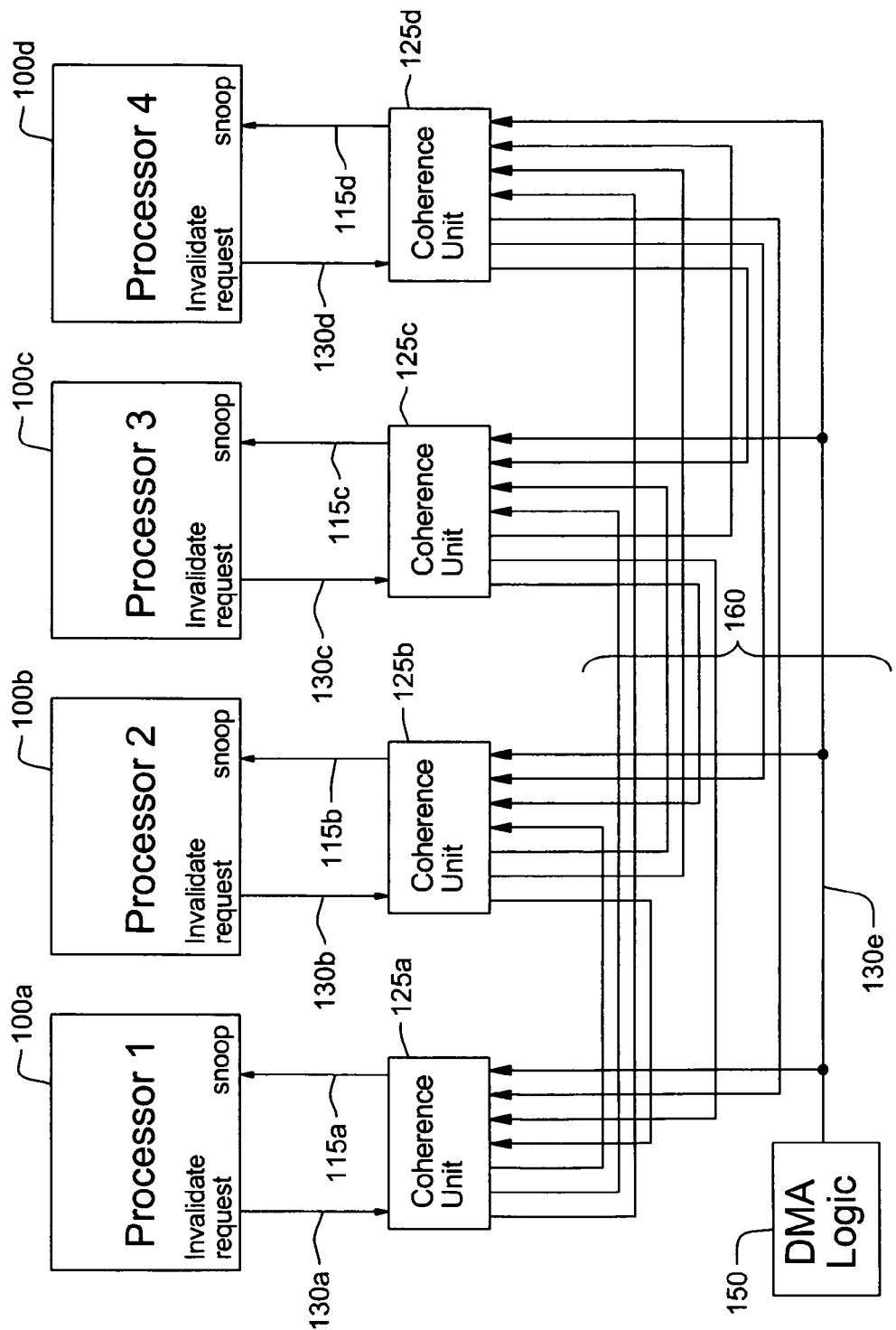
FIG. 1 depicts a coherent multiprocessor system 10 consisting of four processors in which the present invention may be implemented.

FIG. 1 depicts generally an overall base architecture of a multiprocessor system 10 implementing the method and system for arbitrating coherence requests, according to the invention. As shown in FIG. 1, the multiprocessor system 10 is composed of N processors with N=4 (four) processor devices being illustrated, i.e., processors 100a, . . . , 100d. Although not shown, each processor may be equipped with its own local L1 data and instruction caches, and even associated L2 caches (not shown). Further, although not shown in FIG. 1, a main memory may be provided that is shared and can be implemented on-chip or off-chip. In the preferred embodiment, the processor cores 100a, . . . , 100d are PowerPC cores such as PPC440 or PPC405, but any other processor core can be used, or some combination of various processors in a single multiprocessor system can be used without departing from the scope of this invention.

In one embodiment, when a processor desires to write new data to a cache line, each processor device 100a, . . . , 100d issues a respective coherence event signal, e.g., invalidate request signal 130a, . . . 130d. These invalidation request signals are broadcast from the respective processors, and particularly their associated caches, to every other processor cache in the system.

Further associated with each processor, as shown in FIG. 1, is a corresponding Coherence Unit 125a, . . . 125d, that intercepts each invalidate request signal 130a, . . . 130d and generates respective snoop signals 115a, . . . , 115d which are input to the cache memory processing unit of the processor. According to one embodiment of the present invention, the Coherence Unit generally implements the coherence protocol algorithms and the modifications according to the present invention. The Coherence Units may comprise a directory table or snoop filter structure implementing snoop filter logic provided for each respective processor core 100a, . . . , 100d such as described in commonly-owned, U.S. Pat. No. 7,386,683, the whole contents and disclosure of which is incorporated by reference herein. For transferring coherence event signals, e.g., invalidate request signals 130a, . . . 130d, in one embodiment, a point-to-point interconnection scheme 160 is implemented whereby each processor's associated Coherence Unit is directly connected with each coherence unit associated with every other processor in the system. It is understood that other signal coupling architectures may be implemented, e.g., a bus device, to transfer the invalidation request signals between caches associated with the respective processors of the multiprocessor system. Thus, as shown in FIG. 1, invalidate requests 130a, . . . 130d, in particular, are decoupled from all other memory requests transferred via a system local bus, reducing the congestion of that local bus which is often a system bottleneck. All invalidate requests 130a, . . . 130d to a single processor are forwarded to the Coherence Units 125a, . . . 125d. As will be described in greater detail herein, the Coherence Units 125a, . . . 125d process each invalidate request and implement coherence logic of a n-way multiprocessor in accordance with an invalidation coherence protocol. In the example embodiment depicted in FIG. 1, the invalidation coherence protocol governs a four-way multiprocessor environment. The Coherence Unit at each processor collects invalidations 130a, . . . , 130d, from the respective remote processors 100a, . . . , 100d, and additionally, an invalidation 130e from a direct memory access (DMA) logic unit 150 and forwards them to a processor cache through a respective snoop port, indicated in FIG. 1 as snoop ports associated with respective snoop signals 115a, . . . , 115d in the example embodiment depicted.

If the inputs and outputs of the Coherence Unit operate at the same speed, then the Coherence Unit 125a, . . . 125d can receive invalidation requests at four times the rate it can output them to the processor. Therefore, the invalidation requests are stored in a queuing structure as shown and described herein with respect to FIG. 2.

Figure 2:
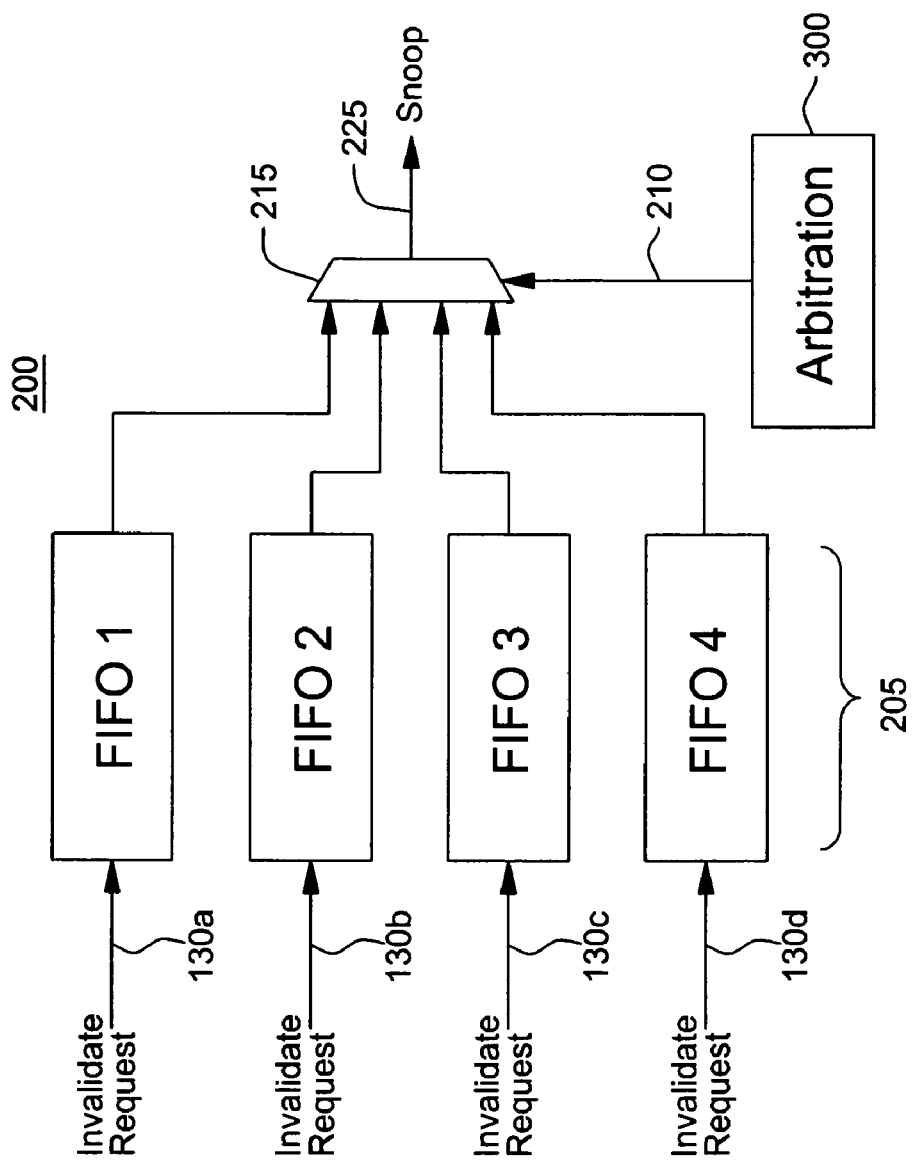
FIG. 2 shows a coherence logic unit including a queuing structure and arbitration unit of the present invention for implementation in the system of FIG. 1.

FIG. 2 particularly illustrates a first-in-first-out (FIFO) queue structure 200 for storing received invalidation requests at a Coherence Unit 125a, . . . 125d. Four parallel FIFO queues 205 enqueue invalidation requests from each of the remote processors and the DMA, where each queue is dedicated to a particular remote source. Invalidate requests arrive into individual queues and arbitration logic implemented by arbiter unit 300 is responsible for sharing the single snoop input of the processor between the outputs of the four queues.

In the multiprocessor environment shown in FIGS. 1 and 2, all of the logic is synchronous and the snoop ports on the processors operate at twice the frequency of the invalidate request ports and the Coherence Units. Therefore, the arbiter unit 300 employing arbitration logic must choose up to two invalidate requests from the four queues in a fair manner on every arbitration cycle in order to maximize use of the processor's snoop port. An arbitration cycle corresponds to a time interval in which said grant signals associated with said one or more of said asserted request signals is generated.

Figure 3:
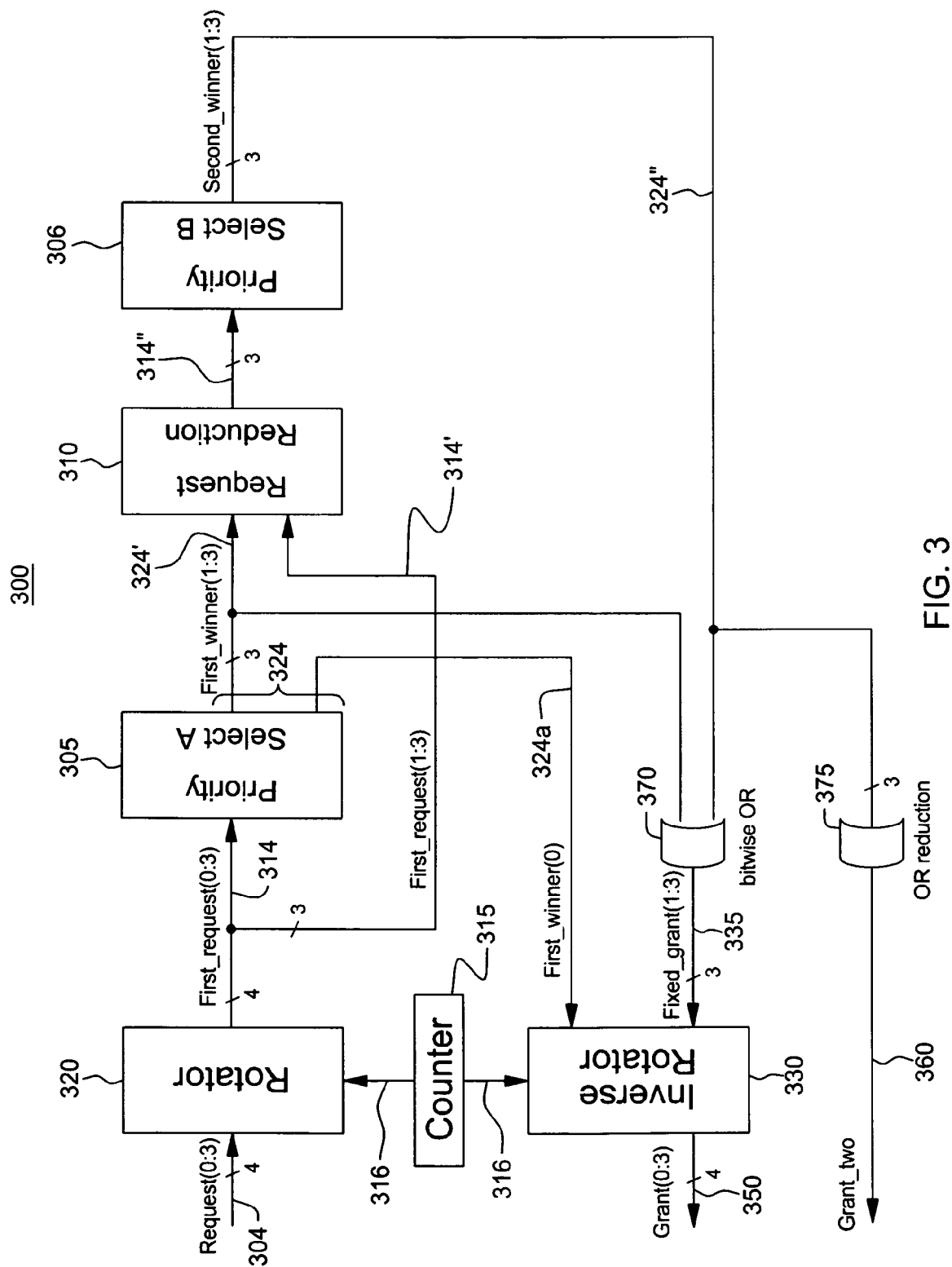
FIG. 3 is a block diagram showing the arbitration unit of the present invention.

FIG. 3 is a circuit block diagram depicting a four-way arbiter 300 of an example embodiment of the invention that selects two request signals out of a possible four (4) input queued coherence requests 304 per arbitration cycle. Particularly, the arbiter 300 includes two priority select circuits 305, 306 and a request reduction circuit 310 implementing logic to function as a fixed arbiter that grants two request signals of highest priority, where priority is determined by numerical pattern or numerical order. For example, in one cycle, signal First_request(0) has highest priority and First_request(3) has lowest priority in a first exemplary scheme. The inputs to the Inverse Rotator circuit 330 are the grants 335 corresponding to the First_request signals, e.g., a First_winner(0) corresponds to First_request(0), a Fixed grant(1) corresponds to First_request(1), and a Fixed grant(2) corresponds to First_request(2), and, a Fixed grant(3) corresponds to First_request(3), in the example embodiment.

In order to achieve fairness, the priority of each of the Request input signals 304 (Request(0:3)) is rotated with respect to the First_request signals 314 (First_request(0:3)) output by the Rotator circuit 320. For example, in one arbitration cycle, Request(0) would correspond to First_request(0), Request(1) would correspond to First_request(1), Request(2) would correspond to First_request(2), and Request(3) would correspond to First_request(3). Therefore, Request(0) would have the highest priority. On the next cycle, input Request(1) would correspond to Rotator circuit output First_request(0), input Request(2) would correspond to output First_request(1), input Request(3) would correspond to output First_request(2), and input Request(0) would correspond to output First_request(3). Therefore, for the next cycle, input Request(1) signal would have highest priority. Rotation continues in this manner, ensuring that every Request signal input reaches the highest priority periodically (e.g., every four arbitration cycles).

Figures 6A, 6B:
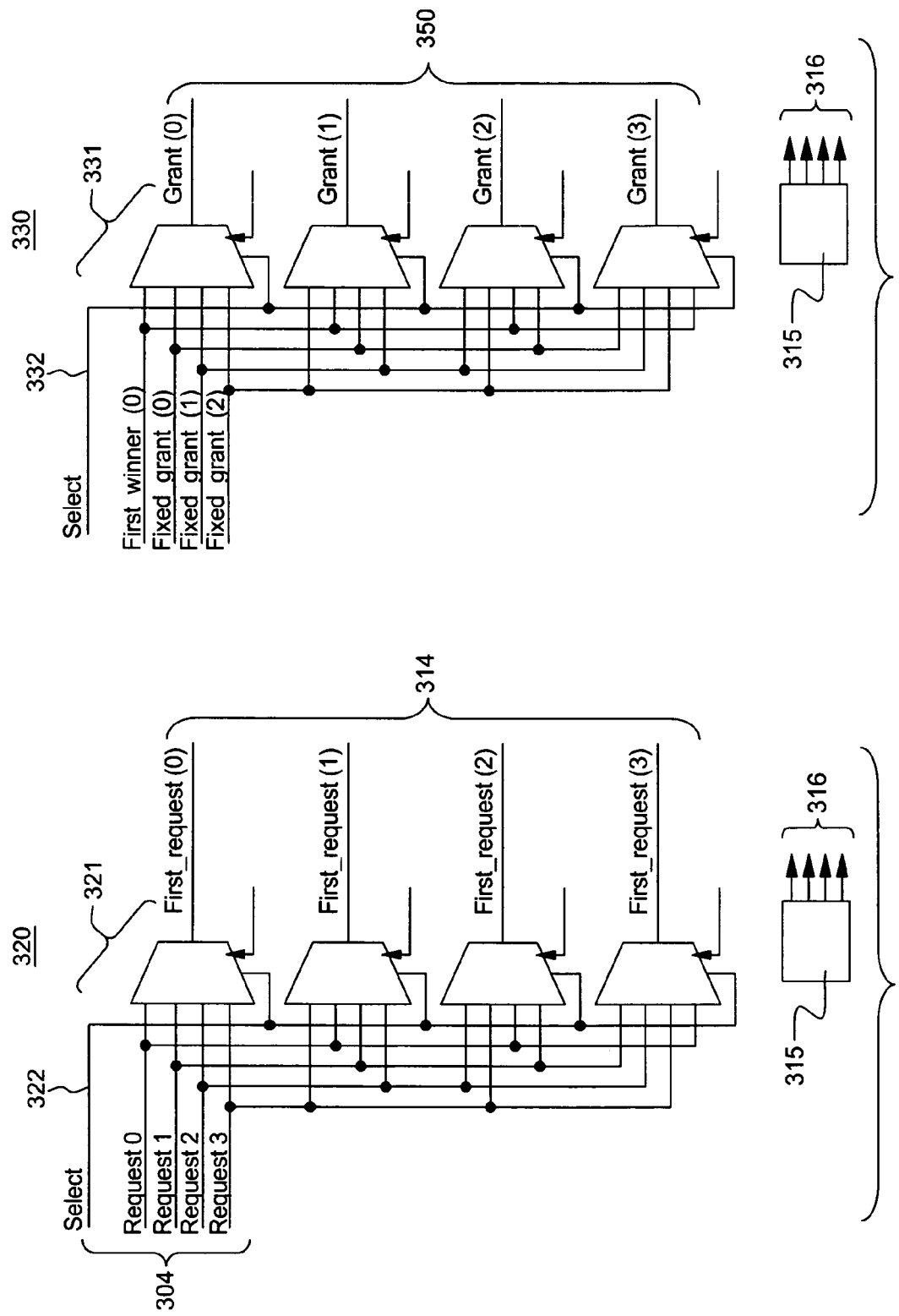

The Inverse Rotator circuit 330 effectively reverses the rotation imposed by the Rotator circuit so that the proper Grant signals 335 are returned to the requesters. Details of an example embodiment of the Rotator 320 and Inverse Rotator 330 circuits are shown in FIGS. 6A and 6B, respectively. In the example embodiments shown in FIGS. 6A and 6B, the rotator 320 and inverse rotator 330 circuits each comprise a bank of simple multiplexer devices 321 and 331, respectively, each respective bank of multiplexer devices connected in parallel. Selector switches 321 and 331 in each respective Rotator 320 and Inverse Rotator 330 circuit activate the bank of multiplexers as driven according to an output of a counter device 315, which may comprise a simple counter device. For example, in one embodiment, the arbiter 300 uses a one-hot, 4-bit counter 315 having outputs 316 that repeatedly progresses through the sequence 0001, 0010, 0100, 1000 that changes the select bits 322 of the rotator 320 and the select bits 332 of the inverse rotator 330 circuit each arbitration cycle at each multiplexer. Therefore, it would be known to those skilled in the art that the bank of multiplexer devices within the Rotator 320 and Inverse Rotator 330 circuits may be built with a simple AND-OR logic gate structure. Those skilled in the art will recognize that there are many additional implementations in which the Rotator and Inverse Rotator circuits could be built.

Figures 4, 5:
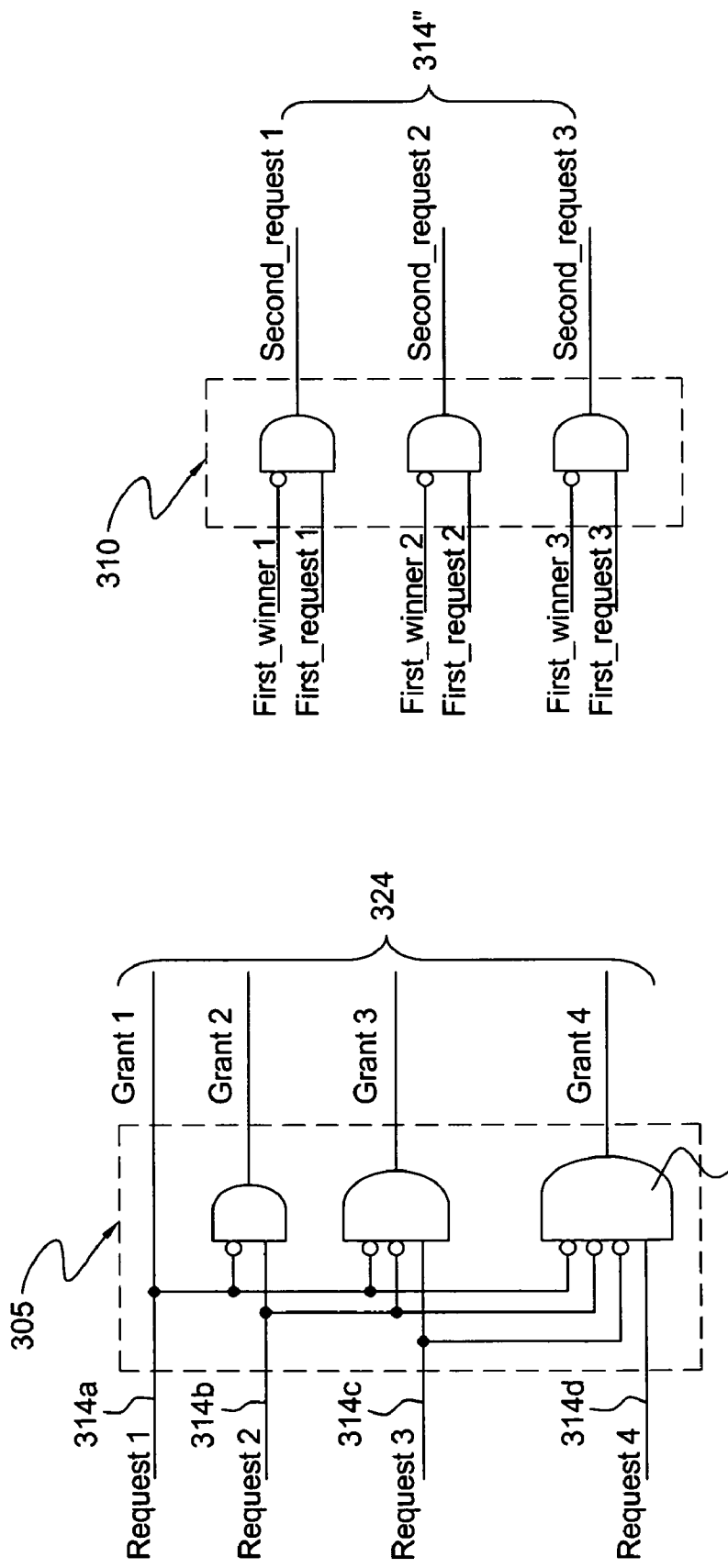
FIG. 4 shows a 4-way priority selector circuit that grants the highest priority request, if there is one.
FIG. 5 shows a 3-way request reduction circuit that couples to the priority selector of FIG. 4 and eliminates the highest-priority request selected by the priority selector; and, FIGS. 6A and 6B illustrate respective rotator circuit that rotates arbiter requests in a round-robin fashion (FIG. 6A) and an inverse-rotator circuit (FIG. 6B) that acts as the complement to the rotator for the arbiter grants according to one embodiment of the invention.

Returning to FIG. 3, the arbiter 300 in the example embodiment may return up to two grant signals in a single arbitration cycle, as now described with respect to FIG. 4 as follows: As shown in FIG. 4, the Priority Selector circuit 305 receives and processes four Request input signals 314a, . . . , 314d and generates four corresponding Grant output signals 324, where Request n corresponds to Grant n (for n=1, 2, 3, or 4). One single Grant output 324a of the grant output signals 324 that is returned every cycle corresponds to the Request input of highest priority, where priority is determined by a numerical order, e.g., Request 1 having the highest priority. If no Request inputs are asserted, then no Grant outputs will be asserted. For example, if Request 2 and Request 4 are asserted, then only Grant 2 will be asserted.

Returning to FIG. 3, the first Priority circuit (Select A) 305 selects the First_request input 314 with highest priority, asserting one of the First_winner outputs 324*a*. In order to determine the First_request 314 with the second highest priority, the First_request 314 with the highest priority is eliminated from the competition by the Request Reduction circuit 310, as now shown and described with respect to FIG. 5. Those skilled in the art will recognize that this circuit has the effect of filtering the First_request(1:3) signals 314 and de-asserting any that were granted by Priority Select A circuit 305 (i.e. based on the First_winner(1:3) signals 324'). There can be at most one such grant 324*a* from Priority Select A as described previously herein. Therefore, the Request Reduction circuit 310 has the effect of de-asserting one of the First_request signals 314 corresponding to the selection made by Priority Select A. There is no need to eliminate First_request(0) because this request will either have been selected as the highest priority by Priority Select A (if Request(0) was asserted), or it would not be asserted at all (if Request(0) was not asserted).

Therefore, as shown in FIG. 3, Priority Select B circuit 306 only has to deal with the three remaining requests, First_request(1:3) signals 314". Priority Select B 306 is identical to Priority Select A as shown in FIG. 4, except that the Request 4 input and Grant 4 output are not connected. Therefore, the AND gate 307 connected to Grant 4 in FIG. 4 could be eliminated from Priority Select B circuit 306. Returning to FIG. 3, priority Select B selects the request with highest priority from the remaining First_request signals 314' (First_request(1:3)), producing Second_winner(1:3) signals 324". Therefore, only one Second_winner signal will be asserted, corresponding to the First_request signal input with the second_highest priority.

As shown in FIG. 3, the First_winner(1:3) signals 324' and Second_winner(1:3) signals 324" are combined by a bitwise OR gate 370 to form the Fixed grant(1:3) signals 335. That is, Fixed grant(1) signal equals the logical AND of First_winner(1) and Second_winner(1), Fixed grant(2) equals the logical AND of First_winner(2) and Second_winner(2), and Fixed grant(3) equals the logical AND of First_winner(3) and Second_winner(3). The resulting inputs to the Inverse Rotator circuit 330 represent the fixed grant signals corresponding to the fixed First_request signals 314, where First_winner(0) corresponds to First_request(0), Fixed grant(1) corresponds to First_request(1), Fixed grant(2) corresponds to First_request(2), and Fixed grant(3) corresponds to First_request(3).

The benefit of the arbiter design shown in FIG. 3 is that the fixed priority arbiter between the Rotator 320 and Inverse Rotator 330 circuits can be optimized for speed because it is relieved of the burden of fairness. Fairness is ensured by the Rotator and Inverse Rotator circuits, which rotate the order with which requests are presented to the fixed priority arbiter so that every input is guaranteed to be the highest priority at some time, as determined by the counter 315.

The operation of the counter 315 shown in FIG. 3 determines the frequency with which the priority of requests is modified. One possibility is to increment the counter on every cycle, as described previously herein. Another possibility is to increment the counter only when a request has been granted (i.e., gate the counter increment with a logical OR of the Grant(0:3) signals 350). Those skilled in the art will recognize that there are many possible algorithms for incrementing the counter and modifying the priorities.

In a further advantageous embodiment, it may be desirable to know when the arbiter logic implemented in FIG. 3 has granted two requests and when it has not. This is provided by way of the Grant_two output signal 360, which is a logical OR, performed by logic OR gate 375 of the three Second_winner(1:3) signals 324". Therefore, the Grant_two signal 360 is asserted whenever the arbiter has granted exactly two requests. Similarly, one could perform a logical OR of the four Grant outputs to produce a signal indicating that at least one request was granted.

In an alternate embodiment, a logical OR is performed of the Request signals to indicate that at least one request was granted, because the arbiter always grants at least one request when any of the Request inputs are asserted. The advantage of this embodiment is that the indication that some Grant is asserted is available earlier.

In the preferred embodiment, the FIFO queues shown in FIG. 2 can provide up to two outputs simultaneously, and the multiplexer can select two invalidate requests from either a single queue or two different queues on every cycle. This feature is useful because the processor's snoop port operates at twice the speed of the queue logic. It is possible that only one queue has invalidation requests pending, either because only one remote processor has produced invalidation requests or one processor has produced more than the others. In this case, the arbiter of FIG. 3 will select the single queue with pending requests as the winner, but will not assert the Grant_two signal 360. The multiplexing logic can then combine the queue entry counts with the Grant_two signal to determine that a single queue can be selected to provide two invalidation requests.

Those skilled in the art will recognize that the arbiter unit 300 of FIG. 3 can be extended by providing additional Request Reduction and Priority Select circuits to produce an arbiter that returns more than two grants per cycle. For example, a Request Reduction circuit (FIG. 5) could be applied to the First_request signals, using the Second_winner signals to filter out the second winner. Then the filtered First_request signals could be applied to two inputs of a Priority Select circuit (FIG. 4) to produce a third winner. A logical OR of the first, second, and third winners would produce up to three Grant signals in a single arbitration cycle. This sort of chaining of Request Reduction and Priority Select circuits could continue to any depth.

Those skilled in the art will recognize that the arbiter of FIG. 3 could produce the First_winner and Second_winner signals independently as outputs. This could be useful in situations where these must be distinguished.

In one example embodiment, the arbitration mechanism enables for the fair and efficient sharing of a snoop, or invalidation, port of a cache between multiple queues of invalidation requests coning from remote processors in a coherent multiprocessor system.

Those skilled in the art will recognize that the arbiter of FIG. 3 has many uses above and beyond the described preferred embodiment. For example, a multi-choice arbiter could be used as a central arbiter in a network switch, where network traffic from several inputs can be routed to several outputs in a single cycle.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. An apparatus for granting one or more requesting entities access to a resource in a predetermined time interval, said requesting entity asserting a request signal for accessing said resource, said apparatus comprising:

first circuit means for receiving one or more request signals and implementing logic in response to received control signals at each successive predetermined time interval for assigning a priority to said one or more request signals, said logic effecting a change of assigned priority for each request signal at each successive predetermined time interval, and, generating a set of first_request signals based on said priorities assigned to said received request signals;

one or more priority select circuits for receiving said set of first_request signals and generating corresponding one or more fixed grant signals representing one or more highest priority request signals when asserted during said predetermined time interval;

second circuit means for receiving said one or more fixed grant signals and implementing logic for generating one or more grant signals associated with one or more highest priority request signals assigned, said grant signals for enabling one or more respective requesting entities access to said resource in said predetermined time interval.

2. The apparatus as claimed in claim 1, wherein a highest priority is associated with a received request signal from a different requesting entity every predetermined time interval.

3. The apparatus as claimed in claim 1, wherein said assigned priority is based on a numerical pattern, said first circuit means including means for changing said numerical pattern with respect to the first_request signals generated each successive predetermined time interval.

4. The apparatus as claimed in claim 1, implemented in a computing system, wherein said requesting entities are multiple processing devices, said apparatus further comprising:

queuing structure for enqueuing request signals, a separate queue structure associated with each processing device of said computing system, each said separate queuing structure responsive to an associated grant signal for enabling dequeuing of a corresponding said request signal for receipt by a requested resource according to said priority assigned in said predetermined interval.

5. The apparatus as claimed in claim 3, wherein logic implemented by said first circuit means includes logic for rotating said numerical pattern in a round-robin fashion each successive predetermined time interval.

6. The apparatus as claimed in claim 3, wherein logic implemented by said second circuit means includes logic for rotating said fixed grant signals in a manner complementary to said rotating logic implemented by said first circuit means, for generating said grant signals associated with said one or more of said asserted received request signals according to said assigned priority.

7. The apparatus as claimed in claim 6, wherein said predetermined time interval corresponds to an arbitration cycle in which said grant signals associated with said one or more of said asserted request signals is generated.

8. The apparatus as claimed in claim 7, wherein said first circuit means for receiving request signals and generating said set of first_request signals comprises:

a counter circuit for generating output count signals that define said control signals each successive predetermined time interval, said first circuit means responsive to said output count signals for changing said numerical pattern to assign a new ordered priority of request signals each predetermined time interval.

9. The apparatus as claimed in claim 8, wherein said one or more priority select circuits for receiving said first_request signals comprises:

a first fixed priority select device for receiving said set of first_request signals and generating a corresponding set of fixed grant signals in a predetermined order, said first fixed priority select device further selecting a first winning fixed grant signal of said set of fixed grant signals, said first winning fixed grant signals for input to said second circuit means.

10. The apparatus as claimed in claim 9, further comprising:

a reduction circuit for:

receiving first_request signals of said set, and, further receiving corresponding first set of fixed grant signals from said first fixed priority select device according to said predetermined order with said first winning fixed grant signal asserted, and, generating a set of second_request signals representing one or more second highest priority request signals with one second_request signal corresponding to said first winning fixed grant signal removed; and, said one or more priority select circuits including a second fixed priority select device for receiving said set of second_request signals and, generating a second set of fixed grant signals for input to said second circuit means, said second set of fixed grant signals including a selected second winning fixed grant signal corresponding to a second first_request signal of highest priority when said corresponding received second_request signals are asserted.

11. The apparatus as claimed in claim 10, wherein up to two request grant signals are generated for corresponding requesting entities each arbitration cycle.

12. A method for granting one or more requesting entities access to a resource in a predetermined time interval, said requesting entity asserting a request signal for accessing said resource, said method comprising:

receiving, at a first circuit device, said asserted request signals and implementing logic in response to control signals received at said first circuit device at each successive predetermined time interval, for assigning a priority to said one or more request signals, generating a set of first_request signals based on said priorities assigned to said received request signals;

receiving, at a priority select circuit, said set of first_request signals and generating corresponding one or more fixed grant signals representing one or more highest priority request signals when asserted during said predetermined time interval;

receiving, at a second circuit device, said one or more fixed grant signals and implementing logic for generating one or more grant signals associated with one or more highest priority request signals assigned, said grant signals for enabling one or more respective requesting entities access to said resource in said predetermined time interval; and, changing, at said first circuit device, in response to received said control signals said assigned priority of each said request signals at each successive predetermined time interval.

13. The method as claimed in claim 12, wherein said assigned priority is based on a numerical pattern, said changing said assigned priority including: changing said numerical pattern with respect to the first_request signals generated each successive predetermined time interval.

14. The method as claimed in claim 12, wherein said requesting entities are multiple processing devices implemented in a computing system, said method further comprising:
enqueuing received request signals in queuing structures, a separate queue structure associated with each processing device of said computing system,
responding to an associated grant signal for enabling dequeuing of a corresponding request signal for receipt by a requested resource according to said priority assigned in said predetermined interval.

15. The method as claimed in claim 13, wherein logic implemented by said first circuit device includes logic for rotating said numerical pattern in a round-robin fashion each successive predetermined time interval.

16. The method as claimed in claim 13, wherein logic implemented by said second circuit device includes logic for rotating said fixed grant signals in a manner complementary to said rotating logic implemented by said first circuit device, said second circuit device further generating said grant signals associated with said one or more of said asserted received request signals according to said assigned priority.

17. The method as claimed in claim 16, wherein said step of changing said assigned priority of request signals each successive predetermined time interval further comprises:
generating, by a counter circuit, output count signals that define said control signals each successive predetermined time interval, said first circuit means responsive to said output count signals for changing said numerical pattern to assign a new ordered priority of request signals each predetermined time interval.

18. The method as claimed in claim 17, wherein said step of generating corresponding one or more fixed grant signals representing one or more highest priority request signals comprises:
providing a first fixed priority select device for receiving said set of first_request signals; and
generating a corresponding set of fixed grant signals in a predetermined order; and,
selecting a first winning fixed grant signal of said set of fixed grant signals, said first winning fixed grant signal for input to said second circuit means.

19. The method as claimed in claim 18, further comprising:
receiving first_request signals of said set, and,
further receiving corresponding first set of flied grant signals according to said predetermined order with said first winning fixed grant signal asserted, and, generating a set of second_request signals representing one or more second highest priority request signals with second_request signal corresponding to said first winning fixed grant signal removed; and,
providing a second fixed priority select device for receiving said set of second_request signals and generating a second set of fixed_grant signals for input to said second circuit means, said second set of fixed_grant signals including a selected second winning fixed grant signal corresponding to a second first_request signal of highest priority when said corresponding received second_request signals are asserted.

20. The method as claimed in claim 19, comprising: generating up to two request grant signals for corresponding requesting entities each predetermined time interval.

21. In a multiprocessor computer system having a plurality of processor devices and associated memory storage devices, wherein each processor device broadcasts event request signals to other processor devices in the system for requesting said other processor devices to perform actions at respective said associated memory storage devices, a coherence logic device associated with each processor device for intercepting said broadcast event request signals from said other processors devices, said coherence logic device comprising:
a plurality of queue structures adapted for receiving and enqueuing said intercepted event request signals associated with a respective requesting processor device; and,
arbitration device for selecting, during an arbitration cycle, one or more queue structures for dequeuing available enqueued event request signals when available for input to said associated processor device according to an assigned priority, said arbitration device selecting up to two or more queue structures for dequening a respective enquened event request signal every arbitration cycle, and, said arbitration device comprises:
a first circuit means for receiving one or more request signals and implementing logic in response to received control signals at each successive arbitration cycle for assigning a priority to said one or more request signals, said logic effecting a change of assigned priority for each request signal at each successive arbitration cycle, and, generating a set of first_request signals based on said priorities assigned to received request signals;
one or more priority select circuits for receiving said set of first_request signals and generating corresponding one or more fixed grant signals representing one or more highest priority request signals when asserted during said arbitration cycle;
second circuit means receiving said one or more fixed grant signals and implementing logic for generating one or more grant signals associated with one or more highest priority request signals assigned, said grant signals for enabling one or more respective requesting entities access to said resource in said arbitration cycle.

22. The coherence logic unit as claimed in claim 21, wherein said assigned priority is based on a numerical pattern, said changing said assigned priority including: changing said numerical pattern with respect to the first_request signals generated each successive arbitration cycle.

23. The coherence logic unit as claimed in claim 21, wherein up to two request grant signals are generated for corresponding requesting entities each arbitration cycle.

24. The coherence logic unit as claimed in claim 22, wherein logic implemented by said first circuit means includes logic for rotating said numerical pattern in a round-robin fashion each successive arbitration cycle.

25. The coherence logic unit as claimed in claim 22, wherein logic implemented by said second circuit device includes logic for rotating said fixed grant signals in a manner complementary to said rotating logic implemented by said first circuit device, said second circuit device further generating said grant signals associated with said one or more of said asserted received request signals according to said assigned priority.

26. The coherence logic unit as claimed in claim 25, wherein said first circuit means for receiving request signals and generating said set of first_request signals comprises:
a counter circuit for generating output count signals that define said control signals each successive arbitration cycle, said first circuit means responsive to said output count signals for changing said numerical pattern to assign a new ordered priority of request signals each arbitration cycle.

27. The coherence logic unit as claimed in claim 26, wherein said one or more priority select circuits for receiving said first_request signals comprises:

a first fixed priority select device for receiving said set of first_request signals and generating a corresponding set of fixed grant signals in a predetermined order, said first fixed priority select device further selecting a first winning fixed grant signal of said set of fixed grant signals, said first winning fixed grant signal for input to said second circuit means.

28. The coherence logic unit as claimed in claim 27, further comprising:

a reduction circuit for:

receiving first_request signals of said set, and, further receiving corresponding first set of fixed grant signals according to said predetermined order with said first whining fixed grant signal asserted, and, generating a set of second_request signals representing one or more second highest priority request signals with second_request signal corresponding to said first winning fixed grant signal removed; and, said one or more priority select circuits including a second fixed priority select device for receiving said set of second_request signals and, generating a second set of fixed_grant signals for input to said second circuit means, said second set of fixed_grant signals including a selected second winning fixed grant signal corresponding to a second first_request signal of highest priority when said corresponding received second_request signals are asserted.

* * * * *